(12) United States Patent
Lei et al.

(10) Patent No.: US 10,334,245 B2
(45) Date of Patent: Jun. 25, 2019

(54) ADJUSTMENT OF INTRA-FRAME ENCODING DISTORTION METRICS FOR VIDEO ENCODING

(71) Applicant: Intel Corporation, Santa Clara, CA (US)

(72) Inventors: Zhijun Ryan Lei, Portland, OR (US); Sang-hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 715 days.

(21) Appl. No.: 14/779,909

(22) PCT Filed: May 9, 2014

(86) PCT No.: PCT/US2014/037537
§ 371 (c)(1),
(2) Date: Sep. 24, 2015

(87) PCT Pub. No.: WO2014/193631
PCT Pub. Date: Dec. 4, 2014

(65) Prior Publication Data
US 2016/0065962 A1    Mar. 3, 2016

Related U.S. Application Data

(60) Provisional application No. 61/829,493, filed on May 31, 2013.

(51) Int. Cl.
*H04B 1/66* (2006.01)
*H04N 7/12* (2006.01)
(Continued)

(52) U.S. Cl.
CPC ......... *H04N 19/124* (2014.11); *H04N 19/105* (2014.11); *H04N 19/107* (2014.11);
(Continued)

(58) Field of Classification Search
CPC .................................................... H04N 19/105
See application file for complete search history.

(56) References Cited

U.S. PATENT DOCUMENTS 6,982,762 B1     1/2006  Hui
8,711,928 B1 *   4/2014  Litvin ................. H04N 19/147
                                                    375/240.03
(Continued)

OTHER PUBLICATIONS

International Searching Authority, "International Search Report and Written Opinion", issued in connection with International Patent Application No. PCT/US2014/037537, dated Sep. 1, 2014 (10 pages).

(Continued)

*Primary Examiner* — Tat C Chio
*Assistant Examiner* — Fabio S Lima
(74) *Attorney, Agent, or Firm* — Hanley, Flight & Zimmerman, LLC

(57) ABSTRACT

Methods, apparatus, systems and articles of manufacture to adjust intra-frame encoding distortion metrics for video encoding are disclosed. Some example methods for video encoding disclosed herein include obtaining an intra-frame encoding distortion metric representative of distortion associated with a first intra-frame encoding mode for encoding a pixel block in a frame of a video sequence. Some such example methods also include adjusting the intra-frame encoding distortion metric based on a characteristic associated with the pixel block to determine an adjusted intra-frame encoding distortion metric. Some such example methods further include comparing the adjusted intra-frame encoding distortion metric with an inter-frame encoding distortion metric representative of distortion associated with a first inter-frame encoding mode for encoding the pixel block to determine whether to use at least one of the first (Continued)

intra-frame encoding mode or the first inter-frame encoding mode to encode the pixel block.

25 Claims, 8 Drawing Sheets

(51) Int. Cl.
*H04N 11/02* (2006.01)
*H04N 11/04* (2006.01)
*H04N 19/124* (2014.01)
*H04N 19/176* (2014.01)
*H04N 19/107* (2014.01)
*H04N 19/154* (2014.01)
*H04N 19/105* (2014.01)
*H04N 19/182* (2014.01)

(52) U.S. Cl.
CPC ......... *H04N 19/154* (2014.11); *H04N 19/176* (2014.11); *H04N 19/182* (2014.11)

(56) References Cited

U.S. PATENT DOCUMENTS

| | | |
|---|---|---|
| 2007/0030894 A1 | 2/2007 | Tian et al. |
| 2007/0237226 A1 | 10/2007 | Regunathan et al. |
| 2010/0027623 A1 | 2/2010 | Larrieu |
| 2010/0149424 A1* | 6/2010 | Yoon ...................... H04N 5/147 348/700 |
| 2010/0238997 A1* | 9/2010 | Yang ..................... H04N 19/105 375/240.03 |
| 2010/0290526 A1 | 11/2010 | Tong et al. |
| 2011/0182356 A1* | 7/2011 | Ammu ................. H04N 19/197 375/240.03 |
| 2012/0039389 A1* | 2/2012 | Sjoberg ................ H04N 19/105 375/240.03 |
| 2014/0307788 A1* | 10/2014 | Lim .................. H04N 19/00781 375/240.12 |
| 2014/0321551 A1* | 10/2014 | Ye ........................ H04N 19/197 375/240.16 |

OTHER PUBLICATIONS

International Searching Authority, "International Preliminary Report on Patentability", issued in connection with International Patent Application No. PCT/US2014/037537, dated Dec. 1, 2015 (5 pages).

* cited by examiner

ADJUSTMENT OF INTRA-FRAME ENCODING DISTORTION METRICS FOR VIDEO ENCODING

RELATED APPLICATION(S)

This patent claims the benefit of and priority from U.S. Provisional Application Ser. No. 61/829,493, entitled "ADAPTIVE INTRA DISTORTION SCALING FOR INTRA/INTER MODE DECISION FOR AVC ENCODING" and filed on May 31, 2013. U.S. Provisional Application Ser. No. 61/829,493 is hereby incorporated by reference in its entirety.

FIELD OF THE DISCLOSURE

This disclosure relates generally to video encoding and, more particularly, to adjustment of intra-frame encoding distortion metrics for video encoding.

BACKGROUND

Modern video encoders typically compress video data for transmission to increase the amount of video-related information able to be conveyed in a given communication bandwidth. The resulting encoded video signal can then be transmitted to a receiver having a suitable video decoder capable of decompressing and/or otherwise decoding the video signal for display on an appropriate display device. Some video encoders are able to implement several different types of video encoding techniques, one or more of which may also have different encoding modes. For example, some video encoders can implement both intra-frame encoding, in which a pixel block of a given video frame is encoded using pixels from one or more neighboring blocks of the same frame as predictors, and inter-frame encoding, in which a pixel block of a given frame is encoded using pixels from one or more different frames as predictors. Additionally, one or both of the intra-frame and inter-frame encoding techniques employed by the video encoder may have different encoding modes corresponding to, for example, the type of block partitioning (e.g., partitioning into blocks of 16×16 pixels, 8×8 pixels, 4×4 pixels, etc.) employed by the particular encoding technique, the direction (e.g., up, left, etc.) from which pixel predictors are chosen relative to the given block to be encoded, etc. A video encoder employing difference types of encoding techniques having different modes may compute distortion metrics associated with the different techniques/modes to thereby permit selection of a particular encoding technique/mode using expected distortion as a selection criterion.

Figure 1:
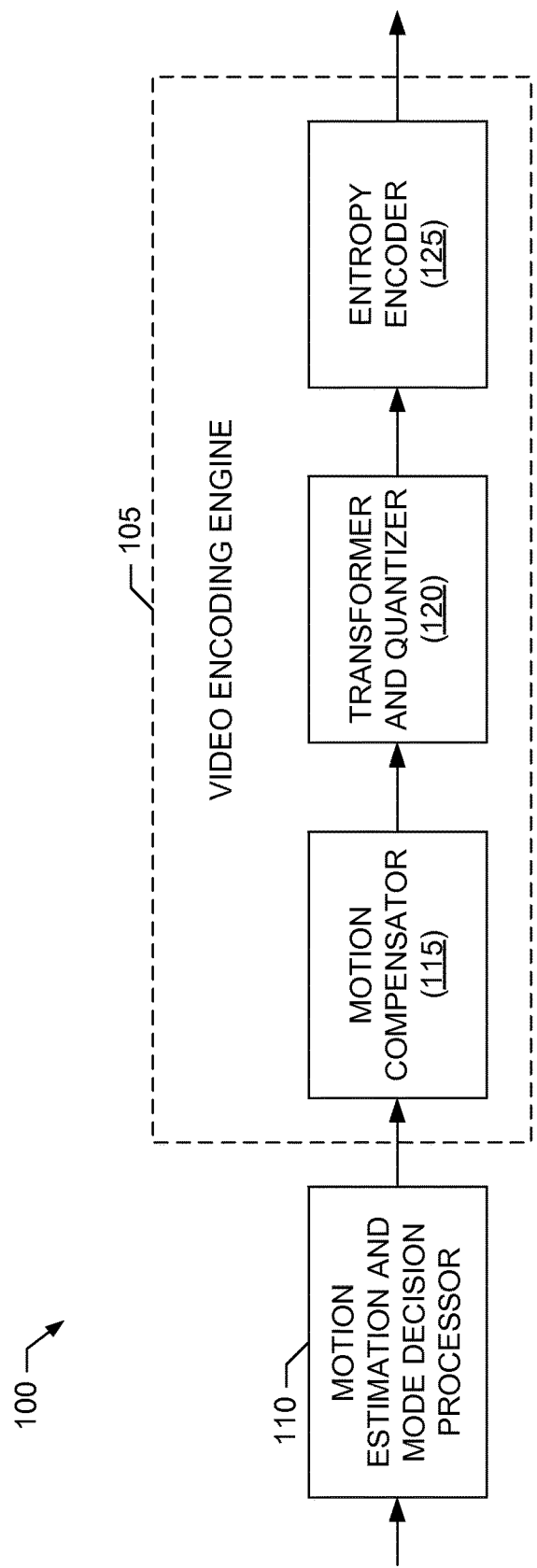
FIG. 1 is a block diagram of an example video encoder employing adjustment of intra-frame encoding distortion metrics for video encoding as disclosed herein.

The material disclosed herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, wherever possible, the same reference numbers will be used throughout the drawing(s) and accompanying written description to refer to the same or like parts, elements, etc.

DETAILED DESCRIPTION

One or more example implementations are now described with reference to the accompanying figures. While specific configurations and arrangements are discussed, it should be understood that this is done for illustrative purposes. Persons of ordinary skill in the relevant art will recognize that other configurations and arrangements may be employed without departing from the spirit and/or scope of the disclosure. It will be apparent to those skilled in the relevant art that techniques and/or arrangements disclosed herein may also be employed in a variety of systems and applications other than those disclosed herein.

While the following disclosure sets forth various example implementations that may be manifested in architectures, such as system-on-a-chip (SoC) architectures, for example, implementation of the techniques and/or arrangements described herein is not restricted to the described architectures and/or computing systems and may be implemented by any appropriate architecture and/or computing system. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details, such as logic implementations, types and interrelationships of system components, logic partitioning/integration choices, etc., the subject matter disclosed herein may be practiced without such specific details. In other examples, some material, such as, for example, control structures and software instruction sequences, may not be shown in detail in order not to obscure the material disclosed herein.

References in the specification to "one implementation," "an implementation," "an example implementation," etc., indicate that the example implementation described may include a particular feature, structure, characteristic, etc., but other examples may not necessarily include that particular feature, structure, characteristic, etc. Moreover, such phrases are not necessarily referring to the same implementation. Further, when a particular feature, structure, characteristic, etc., is described in connection with an example, it is within the knowledge of one of ordinary skill in the art to effect such feature, structure, characteristic, etc., in connection with other implementations whether or not explicitly described herein.

As used herein, the term "coder" refers to an encoder and/or a decoder. Similarly, as used herein, the term "coding" refers to performing video encoding via an encoder and/or performing video decoding via a decoder. For example a video encoder and video decoder are both examples of coders capable of coding video data. In addition, as used herein, the term "codec" refers to any process, program, set of operations, etc., such as, for example, any combination of software, firmware, and/or hardware, that may implement an encoder and/or a decoder. Further, as used herein, the phrase "motion data" refers to any type of data associated with inter-frame encoding, including, but not limited to, one or more motion vectors, reference indices, inter directions, etc.

Methods, apparatus, systems and articles of manufacture (e.g., physical storage structures) to adjust intra-frame encoding distortion metrics for video encoding are disclosed herein. Some example methods disclosed herein for video encoding include obtaining an intra-frame encoding distortion metric representative of distortion associated with a first intra-frame encoding mode for encoding a pixel block in a frame of a video sequence. Such example methods can also include adjusting the intra-frame encoding distortion metric based on a characteristic associated with the pixel block to determine an adjusted intra-frame encoding distortion metric. Such example methods can further include comparing the adjusted intra-frame encoding distortion metric with an inter-frame encoding distortion metric, which is representative of distortion associated with a first inter-frame encoding mode for encoding the pixel block, to determine whether to use at least one of the first intra-frame encoding mode or the first inter-frame encoding mode to encode the pixel block.

In some disclosed example methods, the characteristic corresponds to at least one of a quantization parameter to be used to encode the pixel block, an encoding resolution for encoding the pixel block or an indication whether the pixel block is a reference block to be used for encoding other pixel blocks.

In some disclosed example methods, adjusting the intra-frame encoding distortion metric includes scaling the intra-frame encoding distortion metric by a scale factor selected, based on the characteristic, from a plurality of scale factors associated with a plurality of possible characteristics. For example, the scale factor can be a value greater than or equal to one. In some examples, the characteristic corresponds to a quantization step size to be used to encode the pixel block, the scale factor is selected based on the quantization step size, and the value of the selected scale factor is monotonically non-decreasing as a function of the value of the quantization step size. Additionally or alternatively, in some examples, adjusting the intra-frame encoding distortion metric further includes adjusting the intra-frame encoding distortion metric, after the scaling, by an offset selected, based on the characteristic, from a plurality of offsets associated with the plurality of possible characteristics.

Some disclosed example methods further include selecting the first intra-frame encoding mode to encode the pixel block if the adjusted intra-frame encoding distortion metric is less than the inter-frame encoding distortion metric. Some such example methods also include selecting the first inter-frame encoding mode to encode the pixel block if the inter-frame encoding distortion metric is less than the adjusted intra-frame encoding distortion metric.

In some disclosed example methods, the first intra-frame encoding mode has a lowest intra-frame encoding distortion metric from among a plurality of intra-frame encoding modes capable of being used to encode the pixel block. In some such example methods, the first inter-frame encoding mode has a lowest inter-frame encoding distortion metric from among a plurality of inter-frame encoding modes capable of being used to encode the pixel block.

Some disclosed example methods further include determining the intra-frame encoding distortion metric using original input pixels as predictors for intra-frame prediction of the pixel block performed according to the first intra-frame encoding mode. Some such example methods also include determining the inter-frame encoding distortion metric using reconstructed pixels as predictors for inter-frame prediction of the pixel block performed according to the first inter-frame encoding mode. In some such examples, the reconstructed pixels are obtained by decoding a previously encoded reference block that is to be used to encode the pixel block according to the first inter-frame encoding mode.

These and other example methods, apparatus, systems and articles of manufacture (e.g., physical storage structures) to implement adjusting of intra-frame encoding distortion metrics for video encoding are disclosed in greater detail below.

As mentioned above, a video encoder may implement intra-frame encoding, in which a pixel block of a given video frame is encoded using pixels from one or more neighboring blocks of the same frame as predictors for intra-frame prediction, and inter-frame encoding, in which a pixel block of a given frame is encoded using another pixel block of a different frame as a predictor for inter-frame prediction. The video encoder may further implement different modes for the intra-frame and inter-frame encoding techniques, such as different modes corresponding to different types of block partitioning (e.g., partitioning into blocks of 16×16 pixels, 8×8 pixels, 4×4 pixels, etc.) capable of being used with the intra-frame and/or inter-frame encoding techniques, different directions (e.g., up, left, etc.) from which pixel predictors can be chosen relative to the given block to be encoded using the intra-frame and/or inter-frame encoding techniques, etc. In general, the different encoder techniques/modes implemented by the video encoder each introduce some amount of distortion into the encoded video data due to the compression technique(s), such as quantization, data prediction, etc., used to encode the data.

Accordingly, in some examples, such video encoders determine distortion metrics associated with the different encoding techniques/modes implemented by the video encoder to enable selection of one of the different techniques/modes for encoding a given pixel block and/or frame of video data. However, as explained in further detail below, the distortion metrics determined by prior video encoders for their supported intra-frame encoding techniques/mode may be inaccurate due to approximations made in an effort to improve encoder operating efficiency. Unlike such prior video encoders, a video encoder implemented according the examples disclosed herein adjusts the intra-frame encoding distortion metrics to improve metric accuracy with little to no impact on encoder operating efficiency.

Turning to the figures, a block diagram of an example video encoder 100 implementing adjusting of intra-frame encoding distortion metrics for video encoding as disclosed herein is illustrated in FIG. 1. The example video encoder 100 of FIG. 1 implements multiple different types/modes of video encoding according to one or more video coding standards, such as H.264 video coding, high efficiency video coding (HEVC), VP8 video coding, VP9 video coding, etc. For example, one type of video encoding implemented by the video encoder 100 can be intra-frame encoding, which encodes a given pixel block of a given video frame by pixels from one or more neighboring blocks of the same frame as predictors for predicting the given pixel block, and then encoding the residue, or difference, between the predicted pixel block and the given pixel block. Another type of video encoding implemented by the video encoder 100 can be inter-frame encoding, which encodes a given pixel block of a given video frame by using pixels from another pixel block of a different (e.g., prior or future) frame as predictors for predicting the given pixel block, and then encoding the residue, or difference, between the predicted pixel block and the given pixel block. The different encoding types implemented by the video encoder 100 may each have different modes corresponding to different configurations of the encoding type. For example, the different modes of the intra-frame encoding and/or inter-frame encoding may correspond to (1) different segmentations of the video frames into different arrangements of pixel blocks (e.g., macroblocks), (2) different direction(s) from which one or more reference pixel blocks can be chosen relative to a given pixel block being encoded, etc.

In the illustrated example of FIG. 1, the video encoder 100 includes an example video encoding engine 105 preceded by an example motion estimation and mode decision processor 110. Among other things, the motion estimation and mode decision processor 110 performs a mode decision process to select which one of the different possible combinations of video encoding types and modes (also referred to herein collectively as types/modes or just modes) is to be used to encode a given pixel block in a given video frame. In some examples, the encoding type/mode selected by the motion estimation and mode decision processor 110 can vary among successive encoded pixel blocks (i.e., on a block-by-block basis) or among successive encoded video frames (i.e., on a frame-by-frame basis). To select one of the different possible combinations of video encoding types/modes to encode a particular pixel block, the motion estimation and mode decision processor 110 of the illustrated example computes distortion metrics for the different possible encoding types/modes. The motion estimation and mode decision processor 110 can then select the video encoding type/mode having the best (e.g., lowest) distortion metric for encoding a given pixel block.

In some examples, the distortion metric computed by the motion estimation and mode decision processor 110 for a particular encoding technique/mode compares an original pixel block (e.g., for block-by-block mode selection) or frame (e.g., for frame-by-frame mode selection) with a reconstructed version of the pixel block/frame obtained from encoding and then decoding the pixel block/frame according to the particular encoding technique/mode. However, as explained in further detail below, the motion estimation and mode decision processor 110 may approximate determination of the reconstructed version of the pixel block/frame when computing distortion metrics for the different intra-frame encoding modes supported by the video encoder 100. Such approximation is performed to improve encoder operating efficiency, but may cause the resulting distortion metrics for the different intra-frame encoding modes to be inaccurate, which could potentially cause the motion estimation and mode decision processor 110 to not select the encoding type/mode having the best (e.g., lowest) distortion metric for encoding a given pixel block/frame.

Figure 2:
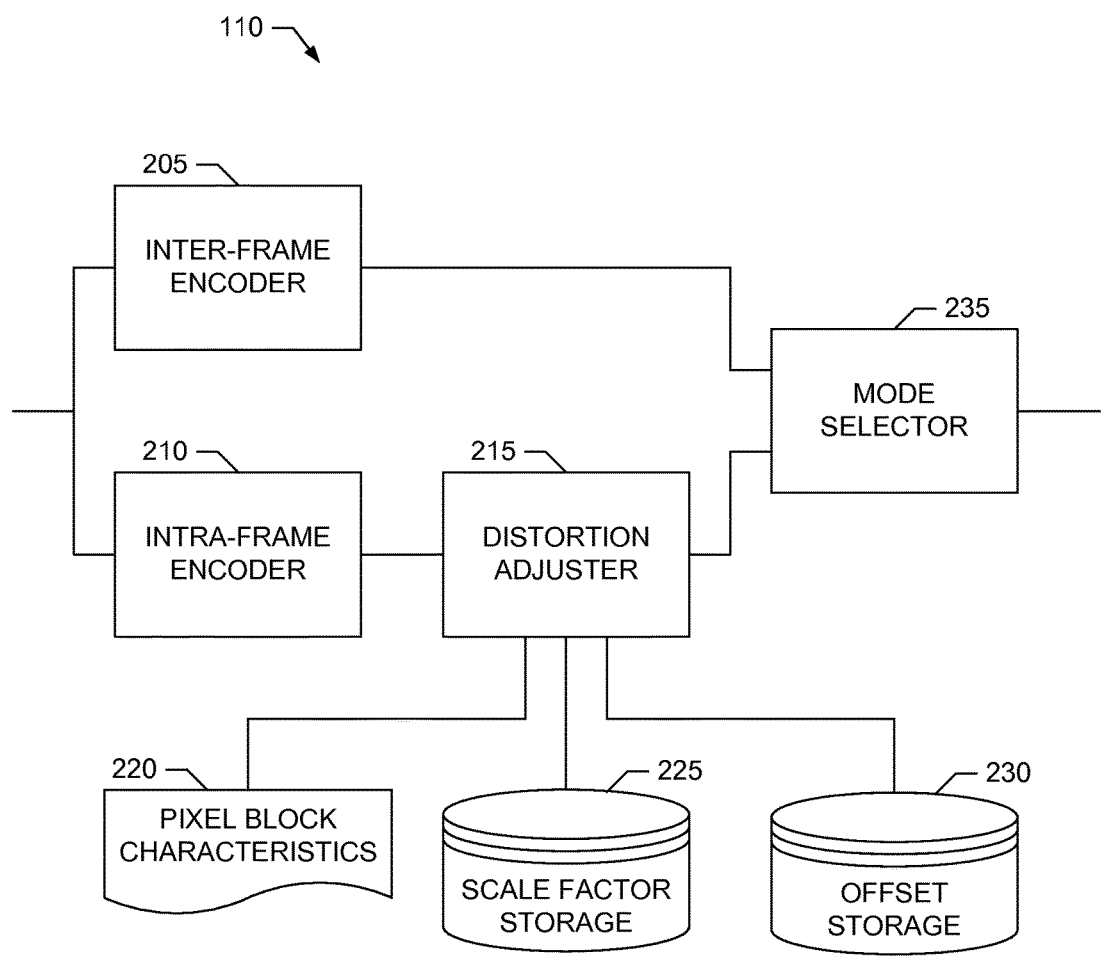
FIG. 2 is a block diagram illustrating an example implementation of an example motion estimation and mode decision processor that can be used to implement intra-frame encoding distortion metric adjustment in the example video encoder of FIG. 1.

To improve metric accuracy with little to no negative impact on encoder operating efficiency, the motion estimation and mode decision processor 110 of the illustrated example is able to adjust an intra-frame encoding distortion metric prior to the metric being used for encoding type/mode selection. In some examples, the motion estimation and mode decision processor 110 can adjust the intra-frame encoding distortion metric computed for a particular intra-frame encoding mode based on a characteristic associated with the given pixel block in the frame of the video sequence being encoded. For example, and as described in further detail below, the motion estimation and mode decision processor 110 may determine one or more characteristics of a given pixel block being encoded, scale the intra-frame encoding distortion metric computed for the particular intra-frame encoding mode by a scale factor selected based on the characteristic(s) from a group of possible scale factors associated with a group of possible characteristics and, in some examples, may further adjust the scaled intra-frame encoding distortion metric by an offset which, in some examples, may also be selected based on the characteristic(s) from a group of possible offsets associated with the group of possible characteristics. The motion estimation and mode decision processor 110 can then compare the adjusted intra-frame encoding distortion metric to one or more other distortion metrics, such as an inter-frame encoding distortion metric determined for a particular inter-frame encoding mode, to decide which encoding technique/mode is to be selected to encode the given pixel block/frame. An example implementation of the motion estimation and mode decision processor 110 is illustrated in FIG. 2, which is described in further detail below.

The example video encoding engine 105 of FIG. 1 includes an example motion compensator 115, an example transformer and quantizer 120 and an example entropy encoder 125. As noted above, in intra-frame and inter-frame encoding, the residue, or difference, between an original pixel block and a predicted pixel block determined from a reference block is encoded to represent the original pixel block. The encoded residue is then transmitted to a video decoder, which estimates the original pixel block by combining the residue with a version of the predicted pixel block formed by the decoder using a previously decoded version of the reference pixel block. The motion compensator 115 of the illustrated example implements any appropriate motion compensation technique to further reduce the amount of video information in the residue, thereby reducing the amount of information needing to be encoded for a given pixel block. In general, motion compensation attempts to define a transformation (e.g., such as a directional shift indicative of motion) that can account for at least some of the difference between original pixel block and a predicted pixel block, thereby reducing the amount of information needed to represent the residue. In some examples, the motion compensator 115 may be omitted from the example video encoder 100.

The example transformer and quantizer 120 of FIG. 1 processes the residue data with any appropriate transform, such as a discrete cosine transform (DCT), wavelet transform, etc., to further reduce the amount of information to be encoded for a given pixel block. The result is a set of transform coefficients representing the residue to be encoded. The transformer and quantizer 120 of the illustrated example then quantizes transform coefficients to further reduce the amount of information to be encoded. For example, the transformer and quantizer 120 can map the range of possible values of the transform coefficients to a (usually smaller) set of discrete values (e.g., amplitude levels), which can thereby reduce the number of bits required for encoding the video data. In some examples, the transformer and quantizer 120 of the illustrated example employs a quantization step size, q, which defines the size of a sub-range of input values that will be mapped to a single discrete value, and its index, denoted as the quantization parameter (QP), is embedded in the encoded video bit stream. In some examples, the transformer and quantizer 120 is omitted from the example video encoder 100.

The example entropy encoder 125 of FIG. 1 implements any appropriate entropy encoding technique to encode the quantized transform coefficients determined by the transformer and quantizer 120 into respective sequences of bits. For example, the entropy encoder 125 can assign sequences of fewer bits to represent transform coefficient values having a higher likelihood of occurrence, and assign sequences of more bits to represent transform coefficient values having a lower likelihood of occurrence. This can, on average, reduce the number of bits required to encode the video data to be output from the video encoder 100. In some examples, the entropy encoder 125 is omitted from the example video encoder 100.

Although FIG. 1 illustrates an example implementation of the video encoder 100, one or more of the blocks illustrated in FIG. 1 can be omitted without departing from the scope of this disclosure. Additionally or alternatively, in some examples, the example video encoder 100 can implement functionality in addition to adjustment of intra-frame encoding distortion metrics for video encoding as disclosed herein.

A block diagram of an example implementation of the motion estimation and mode decision processor 110 of FIG. 1 is illustrated in FIG. 2. The block diagram of FIG. 2 illustrates structures associated with adjusting intra-frame encoding distortion metrics for video encoding in the motion estimation and mode decision processor 110. Other structures implemented by the motion estimation and mode decision processor 110, which are not material to the examples disclosed herein, have been omitted for clarity.

Turning to FIG. 2, the example motion estimation and mode decision processor 110 illustrated therein includes an example inter-frame encoder 205 to implement inter-frame encoding of input video data. The inter-frame encoder 205 of the illustrated example segments an input frame of a video sequence being encoded by the video encoder 100 into a group of pixel blocks, such as macroblocks, pixel regions, etc. For example, for a first mode of inter-frame encoding, the inter-frame encoder 205 may segment an input video frame into pixel blocks of 16-by-16 pixels, or some other number of pixels. The inter-frame encoder 205 of the illustrated example then performs any appropriate type of inter-frame encoding technique to encode a given pixel block of the input video frame by using another pixel block of a different (e.g., prior or future) frame as a reference for predicting the given pixel block. The example inter-frame encoder 205 then determines the residue, or difference, between the predicted pixel block and the given input pixel block. This residue is provided by the example inter-frame encoder 205 to subsequent processing modules of the video encoder 100 to undergo further quantization, encoding and/or other compression processing, as described above. As also described above, the encoded residue is what would then be transmitted to a video decoder, along with other encoding parameters identifying the type/mode of encoding used, the reference pixel block used for encoding, the QP used for quantizing the residue, etc. The video decoder can then reconstruct an estimate of the original pixel block by combining the received residue with a version of the predicted pixel block formed by the decoder using the reference pixel block and the encoding type/mode identified in the received, encoded video data.

In the illustrated example of FIG. 2, the inter-frame encoder 205 implements different modes of inter-frame encoding. The different inter-frame encoding modes implemented by the inter-frame encoder 205 may correspond to, for example, different types of block partitioning (e.g., partitioning into blocks of 16×16 pixels, 8×8 pixels, 4×4 pixels, etc.) capable of being implemented by the inter-frame encoder 205, different frames (e.g., prior or future) from which the inter-frame encoder 205 can choose a reference pixel block for use in predicting a given pixel block to be encoded, etc. To enable the example motion estimation and mode decision processor 110 of FIG. 2 to select which of the different possible inter-frame encoding modes is ultimately to be used to encode a given pixel block (i.e., corresponding to block-by-block mode selection) or input video frame (i.e., corresponding to frame-by-frame mode selection), the inter-frame encoder 205 of the illustrated example computes distortion metrics for the different inter-frame encoding modes for encoding a given pixel block/frame. In some examples, the inter-frame distortion value for a particular inter-frame encoding mode, denoted herein as InterDistortion(Mode), is a measurement of the pixel difference, or distortion error, between an original pixel block or frame and a reconstructed version of the pixel block or frame after being encoded and then decoded according to the particular inter-frame encoding mode, Mode. In some examples, the inter-frame distortion value determined for a particular inter-frame encoding mode, Mode, is also a function of the quantization parameter, QP, used to quantize the encoded residue. In such examples, the inter-frame distortion value for the particular inter-frame encoding mode is denoted herein as InterDistortion(Mode, QP).

Because the inter-frame distortion value is determined using a reconstructed version of a pixel block from one or more reference frames after having been encoded and then decoded, the inter-frame encoder 205 of the illustrated example may implement a corresponding video decoder for one or more, or all, of the different inter-frame encoding modes supported by the video encoder 100. The video decoding implemented by the example inter-frame encoder 205 mimics the operation of an actual video decoder that would receive the video data encoded by the video encoder 100 according to a selected inter-frame encoding mode. Such an actual video decoder would not have access to the original, input source pixels but, instead, would have access to reconstructed pixels obtained by decoding prior received video data. Thus, the video decoder functionality implemented by the example inter-frame encoder 205 of the illustrated example uses reconstructed (e.g., encoded and then decoded) pixels for the reference pixel block that is used for inter-frame prediction of the resulting reconstructed pixel block from the encoded residue for the original input pixel block. By using reconstructed (e.g., encoded and then decoded) pixels for the reference pixel block in the decoding operation, the inter-frame encoder 205 of the illustrated example is able to determine accurate inter-frame distortion metrics for the different inter-frame encoding modes. Furthermore, using reconstructed pixels to determine the inter-frame distortion metrics may have little to no negative effect on encoder operating performance, especially when the reference pixel block for a given input pixel block is selected from a prior video frame. In such examples, the reconstructed pixels for the reference pixel block could be determined while processing the prior video frame and before they are needed for processing the current input video frame.

The example motion estimation and mode decision processor 110 of FIG. 2 also includes an example intra-frame encoder 210 to implement intra-frame encoding of input video data. The intra-frame encoder 210 of the illustrated example segments an input frame of a video sequence being encoded by the video encoder 100 into a group of pixel blocks, such as macroblocks, pixel regions, etc. For example, for a first mode of intra-frame encoding, the intra-frame encoder 210 may segment an input video frame into pixel blocks of 16-by-16 pixels, or some other number of pixels. The intra-frame encoder 210 of the illustrated example then performs any appropriate type of intra-frame encoding technique to encode a given pixel block of the input video frame by using another pixel block of the same input video frame as a reference for predicting the given pixel block. The example intra-frame encoder 210 then determines the residue, or difference, between the predicted pixel block and the given input pixel block. This residue is provided by the example intra-frame encoder 210 to subsequent processing modules of the video encoder 100 to undergo further quantization, encoding and/or other compression processing, as described above. As also described above, the encoded residue is what would then be transmitted to a video decoder, along with other encoding parameters identifying the type/mode of encoding used, the reference pixel block used for encoding, the QP used for quantizing the residue, etc. The video decoder can then reconstruct an estimate of the original pixel block by combining the received residue with a version of the predicted pixel block formed by the decoder using the reference pixel block and the encoding type/mode identified in the received, encoded video data.

In the illustrated example of FIG. 2, the intra-frame encoder 210 implements different modes of intra-frame encoding. The different intra-frame encoding modes implemented by the intra-frame encoder 210 may correspond to, for example, different types of frame segmentation (e.g., macroblocking) capable of being implemented by the intra-frame encoder 210, different directions (e.g., up, left, etc.) from which the intra-frame encoder 210 can choose a reference pixel block for use in predicting a given pixel block to be encoded, etc. To enable the example motion estimation and mode decision processor 110 of FIG. 2 to select which of the different possible intra-frame encoding modes is to be used to encode a given pixel block (i.e., corresponding to block-by-block mode selection) or input video frame (i.e., corresponding to frame-by-frame mode selection), the intra-frame encoder 210 of the illustrated example computes distortion metrics for the different intra-frame encoding modes for encoding a given pixel block/frame. In some examples, the intra-frame distortion value for a particular intra-frame encoding mode, denoted herein as IntraDistortion(Mode), is a measurement of the pixel difference, or distortion error, between an original pixel block or frame and a reconstructed version of the pixel block or frame after being encoded and then decoded according to the particular intra-frame encoding mode, Mode. In some examples, the intra-frame distortion value determined for a particular intra-frame encoding mode, Mode, is also a function of the quantization parameter, QP, used to quantize the encoded residue. In such examples, the inter-frame distortion value for the particular intra-frame encoding mode is denoted herein as IntraDistortion(Mode, QP).

Because the intra-frame distortion value is determined using a reconstructed version of a pixel block or frame after having been encoded and then decoded, the intra-frame encoder 210 of the illustrated example may implement a corresponding video decoder for one or more, or all, of the different intra-frame encoding modes supported by the video encoder 100. The video decoder functionality implemented by the example intra-frame encoder 210 mimics the operation of an actual video decoder that would receive the video data encoded by the video encoder 100 according to a selected intra-frame encoding mode. As noted above, an actual video decoder would not have access to the original, input source pixels but, instead, would have access to reconstructed pixels obtained by decoding prior received video data. Thus, an actual video decoder would use reconstructed pixels in the reference pixel block used for intra-frame prediction of the resulting reconstructed pixel block from the encoded residue for the original input pixel block. However, in the case of intra-frame encoding implemented by hardware, if the encoder uses the reconstructed pixels from the neighboring blocks as references to encode the current block, a dependency on obtaining the reconstructed pixels from the neighboring blocks will be introduced, which results in the blocks not being able to be processed in parallel. Therefore, in a typical hardware based encoder, pixels from the neighboring blocks in the original frame are used in the mode decision stage to calculate the intra-frame distortion.

Accordingly, in some examples, when the intra-frame encoder 210 performs video decoding to determine the intra-frame distortion values for the different supported intra-frame encoding modes, the intra-frame encoder 210 uses original input pixels in the reference pixel blocks used in intra-frame prediction, rather than using reconstructed pixels in the reference pixel blocks. By using the original input pixels as the predictor pixels for intra-frame prediction, the intra-frame encoder 210 avoids incurring the processing delay/overhead discussed above. However, the resulting intra-frame distortion metrics determined by the intra-frame encoder 210 when using the original input pixels as the predictor pixels will be less accurate than if reconstructed pixels were used as the predictor pixels. Furthermore, because the example intra-frame encoder 210 uses original input pixels as the predictor pixels for intra-frame prediction, but the inter-frame encoder 205 uses reconstructed pixels as the predictor pixels for inter-frame prediction, the comparison of the intra-frame distortion metrics to the inter-frame distortion metrics may exhibit an unfair bias in favor of the intra-frame distortion metrics (e.g., because the intra-frame distortion metrics will not reflect the further distortion error that may result when using reconstructed pixels, instead of original input pixels, as the predictor pixels).

To improve intra-frame distortion metric accuracy with little to no impact on encoder operating efficiency, the example motion estimation and mode decision processor 110 of FIG. 2 includes an example distortion adjuster 215. The example distortion adjuster 215 adjusts the intra-frame distortion metric(s) determined by the intra-frame encoder

210 for one or more supported intra-frame encoding modes to account for the use of original input pixels as the predictor pixels when determining the intra-frame distortion metric(s). In the illustrated example, the distortion adjuster 215 dynamically adjusts the intra-frame distortion metric(s), IntraDistortion(Mode), IntraDistortion(Mode, QP), etc., determined by the intra-frame encoder 210 for a particular pixel block (e.g., corresponding to modification on a block-by-block basis) or for the pixel blocks in a particular video frame (e.g., corresponding to modification on a frame-by-frame basis) based on one or more characteristics 220 of the particular pixel block/frame being encoded. For example, the distortion adjuster 215 may dynamically scale the intra-frame distortion metric determined by the intra-frame encoder 210 for a particular pixel block and encoding mode, Mode, using a scale factor selected from an example scale factor storage 225 based on one or more of the pixel block characteristics 220. In such examples, the scale factor storage 225 can store several scale factors determined empirically for different possible pixel block characteristics and/or combinations of characteristics. Additionally or alternatively, in some examples, the distortion adjuster 215 may dynamically offset the intra-frame distortion metric determined by the intra-frame encoder 210 for the particular pixel block and encoding mode, Mode, using an offset selected from an example offset storage 230 based on one or more of the pixel block characteristics 220. In such examples, the offset storage 230 can store several offsets determined empirically for different possible pixel block characteristics and/or combinations of characteristics. Additionally or alternatively, in some examples, the distortion adjuster 215 can dynamically adjust (e.g., scale, offset, etc.) the intra-frame distortion metric determined by the intra-frame encoder 210 for the particular pixel block and encoding mode, Mode, based on inputting the one or more of the pixel block characteristics 220 into a mathematical formula, a mapping, etc., and/or any other appropriate technique. The example scale factor storage 225 and/or the example offset storage 230 can be implemented by any number and/or type(s) of memories, storage devices, etc., such as, but not limited to, the memory 712 and/or the storage 714 of the example system 700, which is described in further detail below.

Example pixel block characteristics 220 that may be used (e.g., evaluated) by the example distortion adjuster 215 to adjust the intra-frame distortion metric(s), IntraDistortion (Mode), IntraDistortion(Mode, QP), etc., determined by the intra-frame encoder 210 for a pixel block (or set of pixel blocks) include, but are not limited to, (1) the QP index specifying the quantization step size, q, to be used to quantize the residue data determined for the pixel block being encoded, (2) whether the pixel block is a reference block to be used for encoding other pixel blocks (or the frame containing the pixel block is a reference frame to be used for encoding other video frames), (3) the video resolution of the frame containing the pixel block, (4) an amount of motion (e.g., a motion vector magnitude) associated with the pixel block, (5) an amount of texture detail associated with the pixel block, etc. For example, the example distortion adjuster 215 of FIG. 2 obtains the QP index identifying the quantization step size, q, being used to encode a given pixel block and then uses a look-up table or other mapping formula/function to obtain, from the scale factor storage 225 and/or the offset storage 230, and/or via calculation, a particular scale factor and/or a particular offset associated with the quantization step size, q, (or the QP identifying the step size). The distortion adjuster 215 of the illustrate example can then scale and/or offset the intra-frame distortion metric(s) output by the intra-frame encoder 210 for the given pixel block using the obtained scale factor and/or offset. Additionally or alternatively, the distortion adjuster 215 can use other pixel block characteristics 220, such as (i) the video resolution of the video frame containing the given pixel block, (ii) the amount of motion and/or the amount of texture detail associated with the given pixel block, (iii) whether the given pixel block is a reference block to be used for encoding other pixel blocks, etc., as input(s) to a look-up table or other mapping formula/function, to obtain, from the scale factor storage 225 and/or the offset storage 230, and/or via calculation, a particular scale factor and/or a particular offset for adjusting the intra-frame distortion metric(s) output by the intra-frame encoder 210 for the given pixel block.

The example motion estimation and mode decision processor 110 of FIG. 2 further includes an example mode selector 235 to select the encoding type/mode to be used to encode a given pixel block (i.e., corresponding to block-by-block mode selection) or input video frame (i.e., corresponding to frame-by-frame mode selection). In the illustrated example, the mode selector 235 obtains an inter-frame encoding distortion metric (e.g., such as InterDistortion (Mode), InterDistortion(Mode, QP), etc.) representative of the inter-frame distortion associated with an inter-frame encoding mode capable of being used for encoding a given pixel block of an input frame of a video sequence. In the illustrated example, the mode selector 235 also obtains an adjusted intra-frame encoding distortion metric (e.g., such as an adjusted version of IntraDistortion(Mode), IntraDistortion(Mode, QP), etc.) representative of the intra-frame distortion, after adjustment by the distortion adjuster 215, associated with an intra-frame encoding mode capable of being used for encoding the given pixel block. The example mode selector 235 then compares the adjusted intra-frame encoding distortion metric with the inter-frame encoding distortion metric to determine whether to use the intra-frame encoding mode associated with the adjusted intra-frame encoding distortion metric or the inter-frame encoding mode associated with the inter-frame encoding distortion metric to encode the given pixel block. For example, the mode selector 235 may select to use the intra-frame encoding mode associated with the adjusted intra-frame encoding distortion metric to encode the given pixel block if the adjusted intra-frame encoding distortion metric is less than the inter-frame encoding distortion metric. However, the mode selector 235 may select to use the inter-frame encoding mode associated with the inter-frame encoding distortion metric to encode the given pixel block if the inter-frame encoding distortion metric is less than the adjusted intra-frame encoding distortion metric.

In some examples, the mode selector 235 receives inter-frame distortion metrics for some or all of the inter-frame encoding modes supported by the inter-frame encoder 205, and adjusted intra-frame distortion metrics for some or all of the intra-frame encoding modes supported by the intra-frame encoder 210. In such examples, the mode selector 235 can perform a comparison across the received inter-frame distortion metrics and adjusted intra-frame distortion metrics to select the particular encoding type (i.e., inter-frame vs. intra-frame) and mode to be used to encode a given input pixel block or frame. In other examples, the mode selector 235 can receive one inter-frame distortion metric corresponding to the inter-frame encoding mode having the best (e.g., lowest) inter-frame distortion metric from among the different inter-frame encoding modes capable of being used to encode the given input pixel block or frame. In such examples, the mode selector 235 can also receive one adjusted intra-frame distortion metric corresponding to the intra-frame encoding mode having the best (e.g., lowest) intra-frame distortion metric from among the different intra-frame encoding modes capable of being used to encode the given input pixel block or frame. In such examples, the mode selector 235 performs a comparison of the one (e.g., best) inter-frame distortion metric with the one (e.g., best) adjusted intra-frame distortion metric to select whether the best inter-frame encoding mode or the best intra-frame encoding mode is to be used to encode the given input pixel block or frame.

Table 1 includes example pseudocode for implementing the example motion estimation and mode decision processor 110 of FIGS. 1 and/or 2. In the example pseudocode of Table 1, at line 10 the distortion adjuster 215 scales (e.g., multiplies) the intra-frame distortion metric, (e.g., IntraDistortion(Mode), IntraDistortion(Mode, QP), etc.), for the best intra-frame encoding mode by a scale factor to determine a scaled intra-frame distortion metric (or adjusted intra-frame distortion metric). At line 11, the mode selector 235 compares the scaled intra-frame distortion metric with the inter-frame distortion metric (e.g., InterDistortion(Mode), InterDistortion(Mode, QP), etc.), for the best inter-frame encoding mode. If the scaled intra-frame distortion metric is less than the inter-frame distortion metric, at line 12 the mode selector 235 selects the best intra-frame encoding mode to be the encoding mode to be used to encode the input pixel block/frame. Otherwise, if the scaled intra-frame distortion metric is not less than the inter-frame distortion metric, at lines 13 and 14 the mode selector 235 selects the best inter-frame encoding mode to be the encoding mode to be used to encode the input pixel block/frame.

TABLE 1

Example Pseudocode for Implementing the Example Motion Estimation and Mode Decision Processor 110

```
10:  ScaledIntraDistortion = ScaleFactor * IntraDistortion
11:  if (ScaledIntraDistortion < InterDistortion)
12:    EncodingMode = BestIntraFrameEncodingMode
13:  else
14:    EncodingMode = BestInterFrameEncodingMode
```

Figure 3:
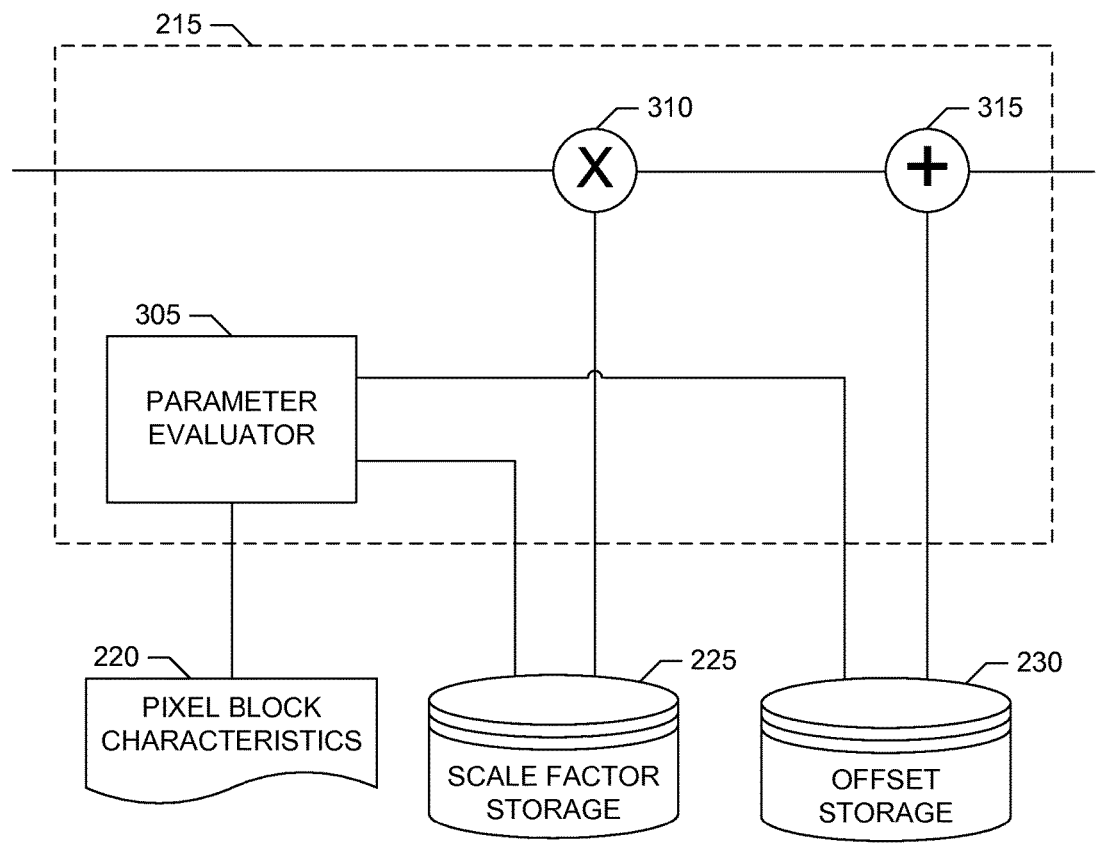
FIG. 3 is a block diagram of an example distortion adjuster that may be used to implement the example motion estimation and mode decision processor of FIG. 2.

A block diagram of an example implementation of the distortion adjuster 215 of FIG. 2 is illustrated in FIG. 3. The example distortion adjuster 215 of FIG. 3 includes an example parameter evaluator 305 to evaluate one or more of the pixel block characteristics 220 associated with a given pixel block/frame to be encoded. The parameter evaluator 305 of the illustrated examples uses the evaluated one or more of the pixel block characteristics 220 to select, from a group of scale factors associated with possible pixel block characteristics and/or combinations thereof, a scale factor from the scale factor storage 225 to be used to adjust (e.g., scale) an input intra-frame distortion metric. Accordingly, the example distortion adjuster 215 of FIG. 3 also includes an example multiplier 310 to multiply or otherwise scale the input intra-frame distortion metric by the selected scale factor. In some examples, the scale factor used by the multiplier 310 to multiply or otherwise scale the input intra-frame distortion metric is a value greater than or equal to one, which will increase (or at least not decrease) the input intra-frame distortion metric to account for original input pixels, and not reconstructed pixels, being used as the predictor pixels when calculating the intra-frame distortion metric.

In some examples, the parameter evaluator 305 uses the evaluated one or more of the pixel block characteristics 220 to select, from a group of offsets associated with possible pixel block characteristics and/or combinations thereof, an offset from the offset storage 230 to be used to adjust (e.g., offset) the input intra-frame distortion metric. Accordingly, in such examples, the distortion adjuster 215 of FIG. 3 additionally or alternatively includes an example adder 315 (or subtractor 315) to add (or subtract) the selected offset from the input intra-frame distortion metric (e.g., after being scaled by the multiplier 310).

Figure 4:
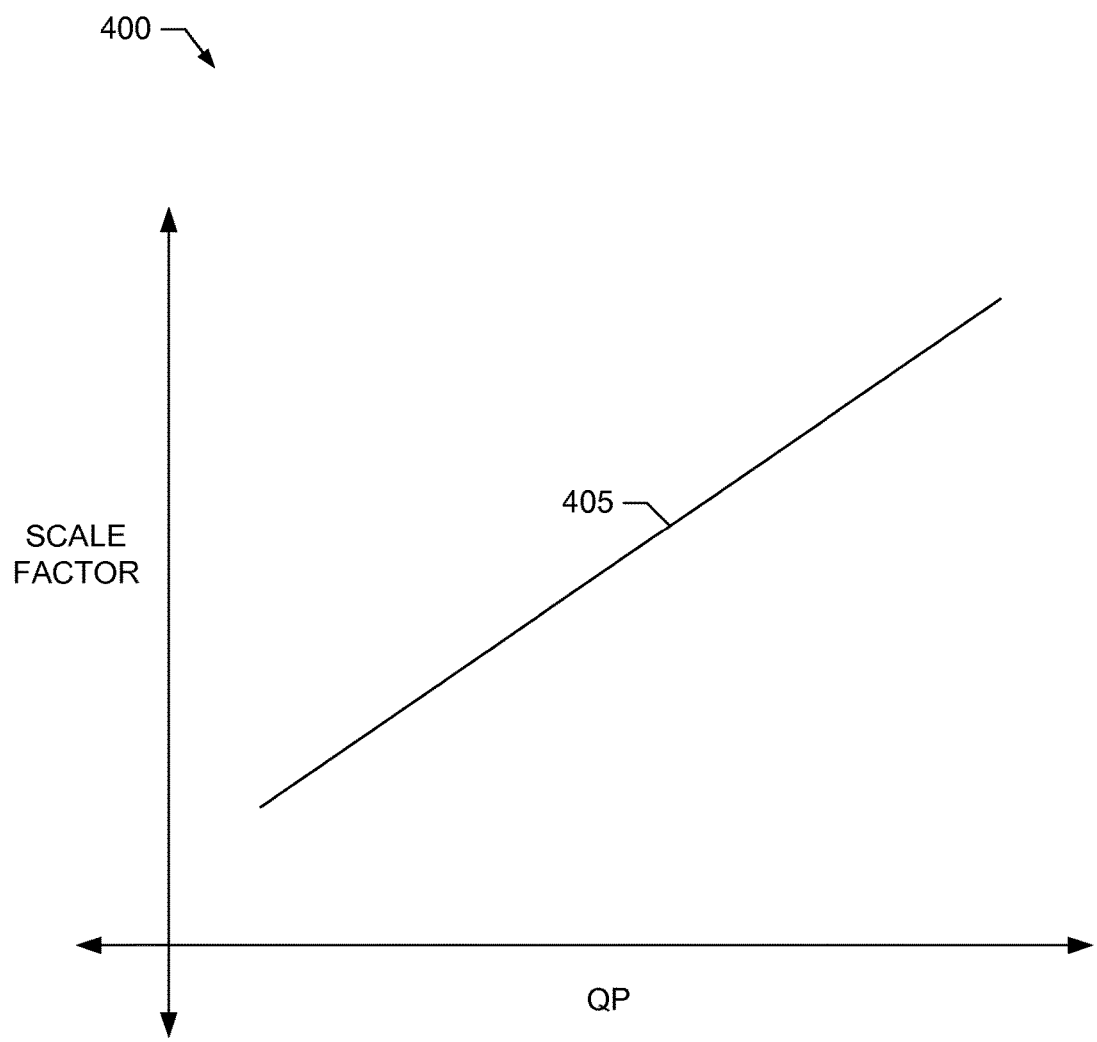
FIG. 4 is a graph illustrating an example adjustment relationship that may be implemented by the example distortion adjuster of FIG. 3 to adjust intra-frame encoding distortion metrics.

As described above, one of the pixel block characteristics that may form the basis of adjusting intra-frame distortion metrics is the QP index specifying the quantization step size, q, to be used to quantize the residue data determined for the pixel block being encoded. Different values of QP or, in other words, different values of the quantization step size, q, may have different effects on the accuracy of the intra-frame distortion metrics determined for the different intra-frame encoding mode(s) supported by the video encoder 100. For example, smaller values of QP or, equivalently, smaller quantization step sizes, q, will generally yield less differences between the original pixel values and reconstructed pixel values than larger values of QP or, equivalently, larger quantization step sizes, q. Thus, the scale factor used for adjusting the intra-frame distortion metrics may be a monotonically non-decreasing function of QP or, equivalently, of the quantization step size, q. The example graph 400 of FIG. 4 illustrates such an example, monotonically non-decreasing function 405, which may characterize the relationship between QP (or q) and the scale factor used for adjusting the intra-frame distortion metrics. As illustrated by the example function 405 of FIG. 4, the scale factor used to scale the intra-frame distortion metric increases as the value of QP (or q) increases. Conversely, the scale factor used to scale an intra-frame distortion metric decreases as the value of QP (or q) decreases, with the scale factor approaching 1 as the value of QP (or q) decreases towards zero.

While example manners of implementing the video encoder 100 are illustrated in FIGS. 1-4, one or more of the elements, processes and/or devices illustrated in FIGS. 1-4 may be combined, divided, re-arranged, omitted, eliminated and/or implemented in any other way. Further, the example video encoding engine 105, the example motion estimation and mode decision processor 110, the example motion compensator 115, the example transformer and quantizer 120, the example entropy encoder 125, the example inter-frame encoder 205, the example intra-frame encoder 210, the example distortion adjuster 215, the example scale factor storage 225, the example offset storage 230, the example mode selector 235, the example parameter evaluator 305, the example multiplier 310, the example adder/subtractor 315 and/or, more generally, the example video encoder 100 of FIGS. 1-4 may be implemented by hardware, software, firmware and/or any combination of hardware, software and/or firmware. Thus, for example, any of the example video encoding engine 105, the example motion estimation and mode decision processor 110, the example motion compensator 115, the example transformer and quantizer 120, the example entropy encoder 125, the example inter-frame encoder 205, the example intra-frame encoder 210, the example distortion adjuster 215, the example scale factor storage 225, the example offset storage 230, the example mode selector 235, the example parameter evaluator 305, the example multiplier 310, the example adder/subtractor 315 and/or, more generally, the example video encoder 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video encoder 100, the example video encoding engine 105, the example motion estimation and mode decision processor 110, the example motion compensator 115, the example transformer and quantizer 120, the example entropy encoder 125, the example inter-frame encoder 205, the example intra-frame encoder 210, the example distortion adjuster 215, the example scale factor storage 225, the example offset storage 230, the example mode selector 235, the example parameter evaluator 305, the example multiplier 310 and/or the example adder/subtractor 315 is/are hereby expressly defined to include a tangible computer readable storage device or storage disk such as a memory, a digital versatile disk (DVD), a compact disk (CD), a Blu-ray disk, etc. storing the software and/or firmware. Further still, the example video encoder 100 may include one or more elements, processes and/or devices in addition to, or instead of, those illustrated in FIGS. 1-4, and/or may include more than one of any or all of the illustrated elements, processes and devices.

Figure 5:
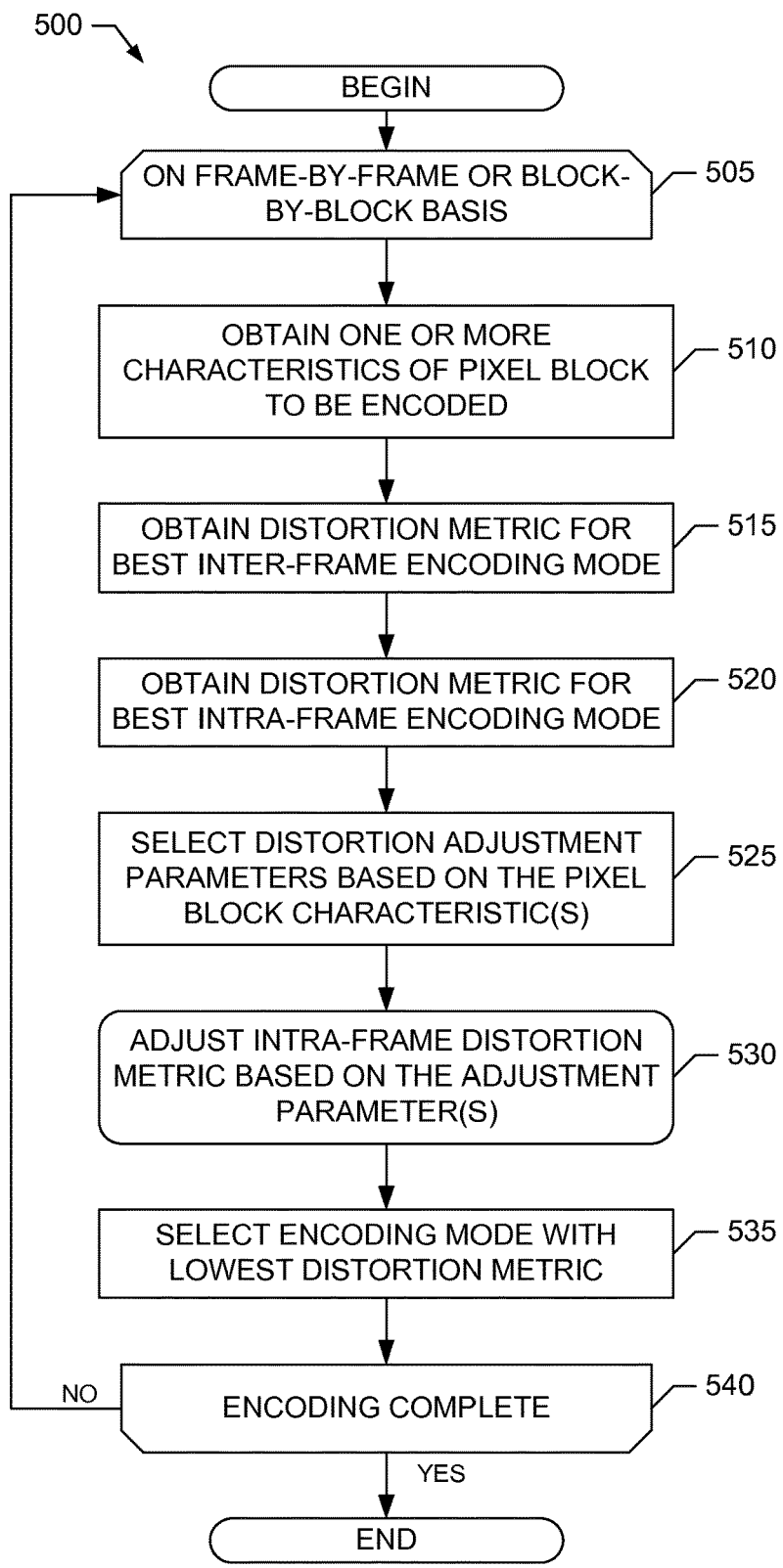
FIG. 5 is a flowchart representative of example machine readable instructions that may be executed to implement the example video encoder of FIG. 1 and/or the example motion estimation and mode decision processor of FIG. 2.
Figure 6:
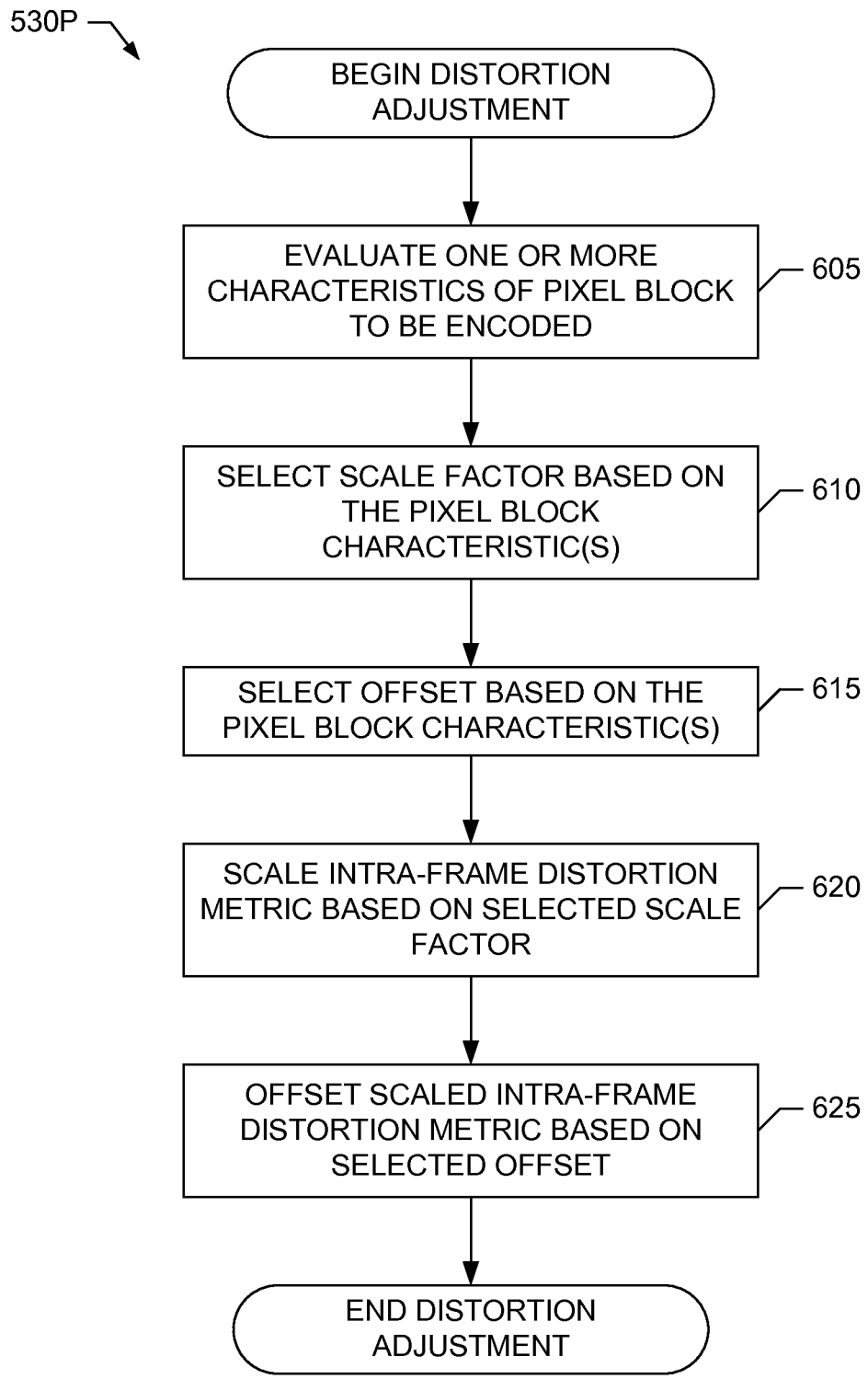
FIG. 6 is a flowchart representative of example machine readable instructions that may be executed to implement the example distortion adjuster of FIG. 3 and/or intra-frame encoding distortion metric adjustment in the example video encoder of FIG. 1 and/or the example motion estimation and mode decision processor of FIG. 2.

Flowcharts representative of example machine readable instructions for implementing the example video encoder 100, the example video encoding engine 105, the example motion estimation and mode decision processor 110, the example motion compensator 115, the example transformer and quantizer 120, the example entropy encoder 125, the example inter-frame encoder 205, the example intra-frame encoder 210, the example distortion adjuster 215, the example scale factor storage 225, the example offset storage 230, the example mode selector 235, the example parameter evaluator 305, the example multiplier 310 and/or the example adder/subtractor 315 are shown in FIGS. 5-6. In these examples, the machine readable instructions comprise one or more programs for execution by a processor, such as the processor 710 shown in the example system 700 discussed below in connection with FIG. 7. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 710, but the entire program or programs and/or portions thereof could alternatively be executed by a device other than the processor 710 and/or embodied in firmware or dedicated hardware (e.g., implemented by an ASIC, a PLD, an FPLD, discrete logic, etc.). Also, one or more of the machine readable instructions represented by the flowcharts of FIGS. 5-6 may be implemented manually. Further, although the example program(s) is(are) described with reference to the flowcharts illustrated in FIGS. 5-6, many other methods of implementing the example video encoder 100, the example video encoding engine 105, the example motion estimation and mode decision processor 110, the example motion compensator 115, the example transformer and quantizer 120, the example entropy encoder 125, the example inter-frame encoder 205, the example intra-frame encoder 210, the example distortion adjuster 215, the example scale factor storage 225, the example offset storage 230, the example mode selector 235, the example parameter evaluator 305, the example multiplier 310 and/or the example adder/subtractor 315 may alternatively be used. For example, with reference to the flowcharts illustrated in FIGS. 5-6, the order of execution of the blocks may be changed, and/or some of the blocks described may be changed, eliminated, combined and/or subdivided into multiple blocks.

As mentioned above, the example processes of FIGS. 5-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-6 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

An example program 500 that may be executed to implement the example video encoder 100 of FIG. 1 is represented by the flowchart shown in FIG. 5. The example program 500 may be executed by the video encoder 100 to encode video data in which video frames of data are segmented in pixel blocks (e.g., such as macroblocks, pixel blocks, etc.) With reference to the preceding figures and associated written descriptions, the example program 500 of FIG. 5 begins execution at block 505 at which the video encoder 100 is configured to adjust, on a block-by-block basis or a frame-by-frame basis, the intra-frame distortion metric(s) (e.g., IntraDistortion(Mode), IntraDistortion(Mode, QP), etc.) used for video encoding, as described above.

At block 510, the example distortion adjuster 215 obtains one or more characteristics of a given pixel block (or frame of pixel blocks) to be encoded, as described above. At block 515, the example inter-frame encoder 205 obtains the inter-frame distortion metric corresponding to the inter-frame encoding mode having the best (e.g., lowest) inter-frame distortion metric from among the different inter-frame encoding modes capable of being used to encode the given input pixel block or frame, as described above. At block 520, the example intra-frame encoder 210 obtains the intra-frame distortion metric corresponding to the intra-frame encoding mode having the best (e.g., lowest) intra-frame distortion metric from among the different intra-frame encoding modes capable of being used to encode the given input pixel block or frame, as described above. At block 525, the distortion adjuster 215 selects one or more distortion adjustment parameters, such as a scale factor and/or an offset, based on the one or more characteristics obtained at block 510, as described above.

At block 530, the distortion adjuster 215 adjusts the intra-frame distortion metric obtained at block 520 based on the adjustment parameter(s) selected at block 525, as described above. Example machine readable instructions that may be used to implement the processing at block 530 are illustrated in FIG. 6 and described in further detail below. At block 535, the example mode selector 235 selects the encoding mode associated with the lowest of the inter-frame distortion metric obtained at block 515 and the adjusted intra-frame distortion metric obtained at block 530, as described above. At block 540, the video encoder 100 causes the processing at blocks 505-535 to continue to be performed until encoding of the video data is completed. After encoding is complete, execution of the example program 1100 ends.

An example program 530P that may be executed to implement the example distortion adjuster 215 of FIGS. 2 and/or 3, and/or used to implement the processing at block 530 of FIG. 5, is represented by the flowchart shown in FIG. 6. With reference to the preceding figures and associated written descriptions, the example program 530P of FIG. 6 begins execution at block 605 at which the example parameter evaluator 305 evaluates one or more characteristics of a given pixel block (or frame of pixel blocks) to be encoded, as described above. At block 610, the example parameter evaluator 305 uses the pixel block characteristic(s) evaluated at block 605 to select, from a group of scale factors associated with possible pixel block characteristics and/or combinations thereof, a scale factor from the scale factor storage 225, as described above. At block 615, the example parameter evaluator 305 uses the pixel block characteristic(s) evaluated at block 605 to select, from a group of offsets associated with possible pixel block characteristics and/or combinations thereof, an offset from the offset storage 230, as described above. At block 620, the example multiplier 310 multiplies or otherwise scales an input intra-frame distortion metric by the scale factor selected at block 610, as described above. At block 625, the example adder 315 (or subtractor 315) adds (or subtracts) the input intra-frame distortion metric by the offset selected at block 615, as described above.

Figure 7:
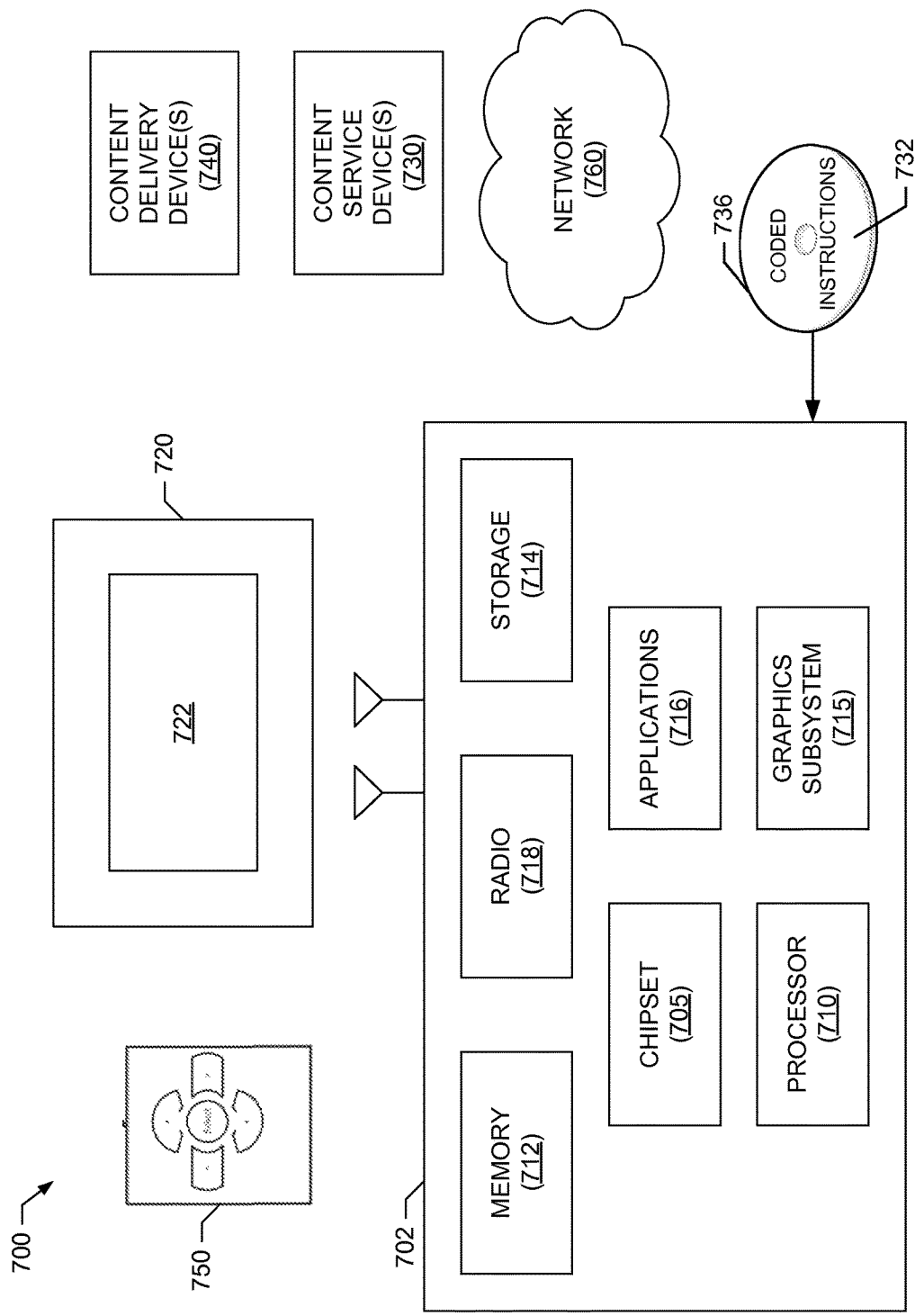
FIG. 7 is a block diagram of an example system that may execute the example machine readable instructions of FIGS. 5 and/or 6 to implement the example video encoder of FIG. 1, the example motion estimation and mode decision processor of FIG. 2 and/or the example distortion adjuster of FIG. 3.

FIG. 7 illustrates an example system 700 capable of executing the instructions of FIGS. 5-6 to implement the example video encoder 100, the example video encoding engine 105, the example motion estimation and mode decision processor 110, the example motion compensator 115, the example inter-frame encoder 205, the example intra-frame encoder 210, the example distortion adjuster 215, the example scale factor storage 225, the example offset storage 230, the example mode selector 235, the example parameter evaluator 305, the example multiplier 310 and/or the example adder/subtractor 315 of FIGS. 1-4. In some examples, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In some examples, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In some examples, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In some examples, processor 710 may be dualcore processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some examples, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The example graphics and/or video processing techniques disclosed herein may be implemented in various hardware architectures. For example, graphics and/or video functionality may be integrated within a chipset. Additionally or alternatively, a discrete graphics and/or video processor may be used. In some examples, the graphics and/or video functions may be provided by a general purpose processor, including a multi-core processor. In some examples, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In some examples, display 720 may include any television type monitor or display. Display 720 may include, for example, a computer display screen, touch screen display, video monitor, television-like device, and/or a television. Display 720 may be digital and/or analog. In some examples, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In some examples, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In some examples, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In some examples, platform 702 may receive control signals from navigation controller 750 having one or more navigation features. The navigation features of controller 750 may be used to interact with user interface 722, for example. In some examples, navigation controller 750 may be a pointing device that may be a computer hardware component (specifically, a human interface device) that allows a user to input spatial (e.g., continuous and multidimensional) data into a computer. Systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In some examples, controller 750 may not be a separate component but may be integrated into platform 702 and/or display 720. The present disclosure, however, is not limited to the elements or in the context shown or described herein.

In some examples, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In some examples, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In some examples, platform 702 and display 720 may be an integrated unit. Display 720 and content service device(s) 730 may be integrated, or display 720 and content delivery device(s) 740 may be integrated, for example. These examples are not meant to limit the present disclosure.

In some examples, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

The disclosure, however, are not limited to the elements or in the context shown or described in FIG. 7.

Coded instructions 732 corresponding to the instructions of FIGS. 5-6 may be stored in the storage 714, in the memory 712 and/or on a removable tangible computer readable storage medium, such as a CD or DVD 736.

Figure 8:
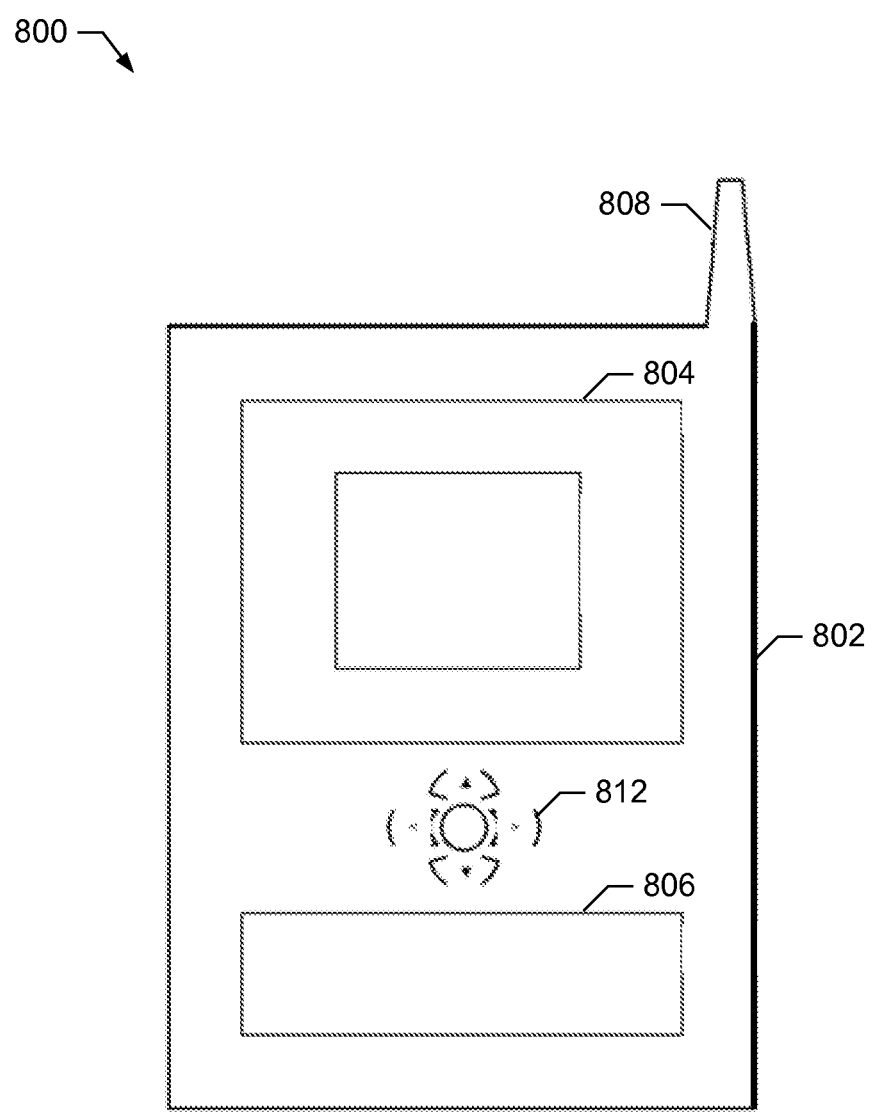
FIG. 8 is a block diagram of an example device that may include the example system of FIG. 7.

The example system 700 may be embodied in varying physical styles or form factors. FIG. 8 illustrates an example of a small form factor device 800 in which the example system 700 may be embodied. In some examples, device 800 may be implemented as a mobile computing device a having wireless capabilities. A mobile computing device may refer to any device intended to be carried by a person in ordinary use and having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device may include computers that are arranged to be worn by a person, such as a wrist computer, finger computer, ring computer, eyeglass computer, belt-clip computer, arm-band computer, shoe computers, clothing computers, and other wearable computers. In some examples, for example, a mobile computing device may be implemented as a smart phone capable of executing computer applications, as well as voice communications and/or data communications. Although some examples are described herein with a mobile computing device implemented as a smart phone, other examples are implemented using other wireless mobile computing devices. The present disclosure is not limited to the specific examples described.

As shown in FIG. 8, the device 800 includes a housing 802, a display 804, an input/output (I/O) device 806, and an antenna 808. The example device 800 also includes navigation features 812. The display 804 of FIG. 8 includes any suitable display unit for displaying information appropriate for a mobile computing device. The I/O device 806 may be implemented by any suitable I/O device for entering information into a mobile computing device. The example I/O device 806 may be implemented by an alphanumeric keyboard, a numeric keypad, a touch pad, input keys, buttons, switches, rocker switches, microphones, speakers, voice recognition device and software, and/or other structures. Information also may be entered into device 800 by way of a microphone. Such information may be digitized by a voice recognition device. The present disclosure is not limited to the specific examples described.

Adjustment of intra-frame encoding distortion metrics for video encoding as disclosed herein may be implemented using hardware, software, or a combination of hardware and software. Examples of hardware include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and/or any combination thereof. Examples of software include software structures, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, and/or any combination thereof. Determining whether an example is implemented using hardware and/or software may vary in accordance with any number of factors, such as desired computational rate, power levels, heat tolerances, processing cycle budget, input data rates, output data rates, memory resources, data bus speeds and/or other design or performance constraints.

The following further examples include subject matter such as a method to perform adjustment of intra-frame encoding distortion metrics for video encoding, means for performing adjustment of intra-frame encoding distortion metrics for video encoding, a machine-readable medium including instructions that, when performed by a machine cause the machine to perform adjustment of intra-frame encoding distortion metrics for video encoding, an apparatus and/or a system to perform adjustment of intra-frame encoding distortion metrics for video encoding as disclosed herein.

Example 1 is a method for video encoding, the method including obtaining an intra-frame encoding distortion metric representative of distortion associated with a first intra-frame encoding mode for encoding a pixel block in a frame of a video sequence. The method of example 1 also includes adjusting, with a processor, the intra-frame encoding distortion metric based on a characteristic associated with the pixel block to determine an adjusted intra-frame encoding distortion metric. The method of example 1 further includes comparing the adjusted intra-frame encoding distortion metric with an inter-frame encoding distortion metric representative of distortion associated with a first inter-frame encoding mode for encoding the pixel block to determine whether to use at least one of the first intra-frame encoding mode or the first inter-frame encoding mode to encode the pixel block.

Example 2 includes the subject matter of example 1, wherein the characteristic corresponds to at least one of a quantization parameter to be used to encode the pixel block, an encoding resolution for encoding the pixel block or an indication whether the pixel block is a reference block to be used for encoding other pixel blocks.

Example 3 includes the subject matter of example 1, wherein adjusting the intra-frame encoding distortion metric includes scaling the intra-frame encoding distortion metric by a scale factor selected, based on the characteristic, from a plurality of scale factors associated with a plurality of possible characteristics.

Example 4 includes the subject matter of example 3, wherein the characteristic corresponds to a quantization step size to be used to encode the pixel block, the scale factor is selected based on the quantization step size, and the value of selected scale factor is monotonically non-decreasing as a function of the value of the quantization step size.

Example 5 includes the subject matter of example 3, wherein adjusting the intra-frame encoding distortion metric further includes adjusting the intra-frame encoding distortion metric, after the scaling, by an offset selected, based on the characteristic, from a plurality of offsets associated with the plurality of possible characteristics.

Example 6 includes the subject matter of example 3, wherein the scale factor is a value greater than or equal to one.

Example 7 includes the subject matter of any one of examples 3 to 5, wherein the scale factor is a value greater than or equal to one.

Example 8 includes the subject matter of example 1, and further includes determining to use the first intra-frame encoding mode to encode the pixel block if the adjusted intra-frame encoding distortion metric is less than the inter-frame encoding distortion metric, and determining to use the first inter-frame encoding mode to encode the pixel block if the inter-frame encoding distortion metric is less than the adjusted intra-frame encoding distortion metric.

Example 9 includes the subject matter of any one of examples 1 to 6, and further includes determining to use the first intra-frame encoding mode to encode the pixel block if the adjusted intra-frame encoding distortion metric is less than the inter-frame encoding distortion metric, and determining to use the first inter-frame encoding mode to encode the pixel block if the inter-frame encoding distortion metric is less than the adjusted intra-frame encoding distortion metric.

Example 10 includes the subject matter of example 1, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 11 includes the subject matter of any one of examples 1 to 6, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 12 includes the subject matter of example 1, and further includes determining the intra-frame encoding distortion metric using original input pixels as predictors for intra-frame prediction of the pixel block performed according to the first intra-frame encoding mode, and determining the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 13 includes the subject matter of any one of examples 1 to 6, and further includes determining the intra-frame encoding distortion metric using original input pixels as predictors for intra-frame prediction of the pixel block performed according to the first intra-frame encoding mode, and determining the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 14 is at least one tangible machine readable storage medium including machine readable instructions which, when executed, cause a machine to at least adjust an intra-frame encoding distortion metric representative of distortion associated with a first intra-frame encoding mode for encoding a pixel block in a frame of a video sequence, the intra-frame encoding distortion metric to be adjusted based on a characteristic associated with the pixel block to determine an adjusted intra-frame encoding distortion metric. The instructions of example 14, when executed, also cause the machine to at compare the adjusted intra-frame encoding distortion metric with an inter-frame encoding distortion metric representative of distortion associated with a first inter-frame encoding mode for encoding the pixel block to determine whether to use at least one of the first intra-frame encoding mode or the first inter-frame encoding mode to encode the pixel block.

Example 15 includes the subject matter of example 14, wherein the characteristic corresponds to at least one of a quantization parameter to be used to encode the pixel block, an encoding resolution for encoding the pixel block or an indication whether the pixel block is a reference block to be used for encoding other pixel blocks.

Example 16 includes the subject matter of example 14, wherein the machine readable instructions, when executed, further cause the machine to scale the intra-frame encoding distortion metric by a scale factor selected, based on the characteristic, from a plurality of scale factors associated with a plurality of possible characteristics.

Example 17 includes the subject matter of example 16, wherein the characteristic corresponds to a quantization step size to be used to encode the pixel block, the scale factor is selected based on the quantization step size, and the value of selected scale factor is monotonically non-decreasing as a function of the value of the quantization step size.

Example 18 includes the subject matter of example 16, wherein the machine readable instructions, when executed, further cause the machine to adjust the intra-frame encoding distortion metric, after being scaled, by an offset selected, based on the characteristic, from a plurality of offsets associated with the plurality of possible characteristics.

Example 19 includes the subject matter of example 16, wherein the scale factor is a value greater than or equal to one.

Example 20 includes the subject matter of any one of examples 16 to 18, wherein the scale factor is a value greater than or equal to one.

Example 21 includes the subject matter of example 14, wherein the machine readable instructions, when executed, further cause the machine to determine to use the first intra-frame encoding mode to encode the pixel block if the adjusted intra-frame encoding distortion metric is less than the inter-frame encoding distortion metric, and determine to use the first inter-frame encoding mode to encode the pixel block if the inter-frame encoding distortion metric is less than the adjusted intra-frame encoding distortion metric.

Example 22 includes the subject matter of any one of examples 14 to 19, wherein the machine readable instructions, when executed, further cause the machine to determine to use the first intra-frame encoding mode to encode the pixel block if the adjusted intra-frame encoding distortion metric is less than the inter-frame encoding distortion metric, and determine to use the first inter-frame encoding mode to encode the pixel block if the inter-frame encoding distortion metric is less than the adjusted intra-frame encoding distortion metric.

Example 23 includes the subject matter of example 14, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 24 includes the subject matter of any one of examples 14 to 19, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 25 includes the subject matter of example 14, wherein the machine readable instructions, when executed, further cause the machine to determine the intra-frame encoding distortion metric using original input pixels as predictors for intra-frame prediction of the pixel block performed according to the first intra-frame encoding mode, and determine the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 26 includes the subject matter of any one of examples 14 to 19, wherein the machine readable instructions, when executed, further cause the machine to determine the intra-frame encoding distortion metric using original input pixels as predictors for intra-frame prediction of the pixel block performed according to the first intra-frame encoding mode, and determine the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 27 is at least one tangible machine readable storage medium including machine readable instructions which, when executed, cause a machine to perform a method as defined in any one of examples 1 to 13.

Example 28 is a video encoder including a distortion adjuster to adjust an intra-frame encoding distortion metric representative of distortion associated with a first intra-frame encoding mode for encoding a pixel block in a frame of a video sequence, the intra-frame encoding distortion metric to be adjusted based on a characteristic associated with the pixel block to determine an adjusted intra-frame encoding distortion metric. The video encoder of example 28 also includes a mode selector to compare the adjusted intra-frame encoding distortion metric with an inter-frame encoding distortion metric representative of distortion associated with a first inter-frame encoding mode for encoding the pixel block to determine whether to use at least one of the first intra-frame encoding mode or the first inter-frame encoding mode to encode the pixel block.

Example 29 includes the subject matter of example 28, wherein the characteristic corresponds to at least one of a quantization parameter to be used to encode the pixel block, an encoding resolution for encoding the pixel block or an indication whether the pixel block is a reference block to be used for encoding other pixel blocks.

Example 30 includes the subject matter of example 28, wherein the distortion adjuster is to scale the intra-frame encoding distortion metric by a scale factor selected, based on the characteristic, from a plurality of scale factors associated with a plurality of possible characteristics.

Example 31 includes the subject matter of example 30, wherein the characteristic corresponds to a quantization step size to be used to encode the pixel block, the scale factor is selected based on the quantization step size, and the value of selected scale factor is monotonically non-decreasing as a function of the value of the quantization step size.

Example 32 includes the subject matter of example 30, wherein the distortion adjuster is to adjust the intra-frame encoding distortion metric, after being scaled, by an offset selected, based on the characteristic, from a plurality of offsets associated with the plurality of possible characteristics.

Example 33 includes the subject matter of example 30, wherein the scale factor is a value greater than or equal to one.

Example 34 includes the subject matter of any one of examples 30 to 32, wherein the scale factor is a value greater than or equal to one.

Example 35 includes the subject matter of example 28, wherein the mode selector is to determine to use the first intra-frame encoding mode to encode the pixel block if the adjusted intra-frame encoding distortion metric is less than the inter-frame encoding distortion metric, and determine to use the first inter-frame encoding mode to encode the pixel block if the inter-frame encoding distortion metric is less than the adjusted intra-frame encoding distortion metric.

Example 36 includes the subject matter of any one of examples 28 to 33, wherein the mode selector is to determine to use the first intra-frame encoding mode to encode the pixel block if the adjusted intra-frame encoding distortion metric is less than the inter-frame encoding distortion metric, and determine to use the first inter-frame encoding mode to encode the pixel block if the inter-frame encoding distortion metric is less than the adjusted intra-frame encoding distortion metric.

Example 37 includes the subject matter of example 28, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 38 includes the subject matter of any one of examples 28 to 33, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 39 includes the subject matter of example 28, and further includes a processor to determine the intra-frame encoding distortion metric using original input pixels as predictors for intra-frame prediction of the pixel block performed according to the first intra-frame encoding mode, and determine the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 40 includes the subject matter of any one of examples 28 to 33, and further includes a processor to determine the intra-frame encoding distortion metric using original input pixels as predictors for intra-frame prediction of the pixel block performed according to the first intra-frame encoding mode, and determine the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 41 is a video encoder configured to perform a method as defined in any one of examples 1 to 13.

Example 42 is an apparatus for video encoding, the apparatus including means for obtaining an intra-frame encoding distortion metric representative of distortion associated with a first intra-frame encoding mode for encoding a pixel block in a frame of a video sequence. The apparatus of example 42 also includes means for adjusting the intra-frame encoding distortion metric based on a characteristic associated with the pixel block to determine an adjusted intra-frame encoding distortion metric. The apparatus of example 42 further includes means for comparing the adjusted intra-frame encoding distortion metric with an inter-frame encoding distortion metric representative of distortion associated with a first inter-frame encoding mode for encoding the pixel block to determine whether to use at least one of the first intra-frame encoding mode or the first inter-frame encoding mode to encode the pixel block.

Example 43 includes the subject matter of example 42, wherein the characteristic corresponds to at least one of a quantization parameter to be used to encode the pixel block, an encoding resolution for encoding the pixel block or an indication whether the pixel block is a reference block to be used for encoding other pixel blocks.

Example 44 includes the subject matter of example 42, wherein the adjusting means includes means for scaling the intra-frame encoding distortion metric by a scale factor selected, based on the characteristic, from a plurality of scale factors associated with a plurality of possible characteristics.

Example 45 includes the subject matter of example 44, wherein the characteristic corresponds to a quantization step size to be used to encode the pixel block, the scale factor is selected based on the quantization step size, and the value of selected scale factor is monotonically non-decreasing as a function of the value of the quantization step size.

Example 46 includes the subject matter of example 44, wherein the adjusting means further includes means for adjusting the intra-frame encoding distortion metric, after the scaling, by an offset selected, based on the characteristic, from a plurality of offsets associated with the plurality of possible characteristics.

Example 47 includes the subject matter of example 44, wherein the scale factor is a value greater than or equal to one.

Example 48 includes the subject matter of any one of examples 44 to 46, wherein the scale factor is a value greater than or equal to one.

Example 49 includes the subject matter of example 42, and further includes means for determining to use the first intra-frame encoding mode to encode the pixel block if the adjusted intra-frame encoding distortion metric is less than the inter-frame encoding distortion metric, and means for determining to use the first inter-frame encoding mode to encode the pixel block if the inter-frame encoding distortion metric is less than the adjusted intra-frame encoding distortion metric.

Example 50 includes the subject matter of any one of examples 42 to 47, and further includes means for determining to use the first intra-frame encoding mode to encode the pixel block if the adjusted intra-frame encoding distortion metric is less than the inter-frame encoding distortion metric, and means for determining to use the first inter-frame encoding mode to encode the pixel block if the inter-frame encoding distortion metric is less than the adjusted intra-frame encoding distortion metric.

Example 51 includes the subject matter of example 42, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 52 includes the subject matter of any one of examples 42 to 47, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

Example 53 includes the subject matter of example 42, and further includes means for determining the intra-frame encoding distortion metric using original input pixels as predictors for intra-frame prediction of the pixel block performed according to the first intra-frame encoding mode, and means for determining the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 54 includes the subject matter of any one of examples 42 to 47, and further includes means for determining the intra-frame encoding distortion metric using original input pixels as predictors for intra-frame prediction of the pixel block performed according to the first intra-frame encoding mode, and means for determining the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

Example 55 is an apparatus including means for performing a method as defined in any one of examples 1 to 13.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for video encoding, the method comprising:
  obtaining an intra-frame encoding distortion metric representative of distortion associated with a first intra-frame encoding mode to encode a pixel block in a frame of a video sequence;

adjusting, by executing an instruction with a processor, the intra-frame encoding distortion metric based on a characteristic associated with the pixel block to determine an adjusted intra-frame encoding distortion metric, the characteristic corresponding to a quantization step size to be used to encode the pixel block, the adjusting of the intra-frame encoding distortion metric including scaling the intra-frame encoding distortion metric by a scale factor based on the quantization step size, the value of the scale factor being monotonically non-decreasing as a function of the value of the quantization step size; and comparing, by executing an instruction with the processor, the adjusted intra-frame encoding distortion metric with an inter-frame encoding distortion metric representative of distortion associated with a first inter-frame encoding mode to encode the pixel block to determine whether to use at least one of the first intra-frame encoding mode or the first inter-frame encoding mode to encode the pixel block.

2. The method as defined in claim 1, wherein the characteristic is a first characteristic and the adjusting of the intra-frame encoding distortion metric is based on a combination of characteristics, the combination including at least one of an encoding resolution to encode the pixel block or an indication whether the pixel block is a reference block to be used to encode other pixel blocks.

3. The method as defined in claim 1, wherein the scale factor is one of a plurality of scale factors associated with a plurality of possible characteristics.

4. The method as defined in claim 1, wherein the adjusting of the intra-frame encoding distortion metric further includes adjusting the intra-frame encoding distortion metric, after the scaling, by an offset associated with the characteristic.

5. The method as defined in claim 1, further including:
determining to use the first intra-frame encoding mode to encode the pixel block if the adjusted intra-frame encoding distortion metric is less than the inter-frame encoding distortion metric; and
determining to use the first inter-frame encoding mode to encode the pixel block if the inter-frame encoding distortion metric is less than the adjusted intra-frame encoding distortion metric.

6. The method as defined in claim 1, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

7. The method as defined in claim 1 further including:
determining the intra-frame encoding distortion metric using original input pixels as predictors for intra-frame prediction of the pixel block performed according to the first intra-frame encoding mode; and
determining the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

8. The method as defined in claim 1, wherein the scale factor is a value greater than or equal to one.

9. At least one non-transitory computer readable medium comprising computer readable instructions which, when executed, cause a machine to at least:
adjust an intra-frame encoding distortion metric representative of distortion associated with a first intra-frame encoding mode to encode a pixel block in a frame of a video sequence to determine an adjusted intra-frame encoding distortion metric, the adjustment of the intra-frame encoding distortion metric based on a characteristic associated with the pixel block, the characteristic corresponding to a quantization step size to be used to encode the pixel block, the adjustment of the intra-frame encoding distortion metric including scaling the intra-frame encoding distortion metric by a scale factor based on the quantization step size, the value of the scale factor being monotonically non-decreasing as a function of the value of the quantization step size; and
compare the adjusted intra-frame encoding distortion metric with an inter-frame encoding distortion metric representative of distortion associated with a first inter-frame encoding mode to encode the pixel block to determine whether to use at least one of the first intra-frame encoding mode or the first inter-frame encoding mode to encode the pixel block.

10. The at least one non-transitory computer readable medium as defined in claim 9, wherein the scale factor is one of a plurality of scale factors associated with a plurality of possible characteristics.

11. The at least one non-transitory computer readable medium as defined in claim 9, wherein the computer readable instructions, when executed, further cause the machine to adjust the intra-frame encoding distortion metric, after being scaled, by an offset associated with the characteristic.

12. The at least one non-transitory computer readable medium as defined in claim 9, wherein the scale factor is a value greater than or equal to one.

13. The at least one non-transitory computer readable medium as defined in claim 9, wherein the characteristic is a first characteristic and the computer readable instructions, when executed, cause the machine to adjust the intra-frame encoding distortion metric based on a combination of characteristics, the combination including at least one of an encoding resolution to encode the pixel block or an indication whether the pixel block is a reference block to be used to encode other pixel blocks.

14. A video encoder comprising:
a distortion adjuster to adjust an intra-frame encoding distortion metric representative of distortion associated with a first intra-frame encoding mode to encode a pixel block in a frame of a video sequence to determine an adjusted intra-frame encoding distortion metric, the intra-frame encoding distortion metric to be adjusted based on a characteristic associated with the pixel block, the characteristic corresponding to a quantization step size to be used to encode the pixel block, the distortion adjuster to adjust the intra-frame encoding distortion metric by scaling the intra-frame encoding distortion metric by a scale factor based on the quantization step size, the value of the scale factor to be monotonically non-decreasing as a function of the value of the quantization step size; and
a mode selector to compare the adjusted intra-frame encoding distortion metric with an inter-frame encoding distortion metric representative of distortion associated with a first inter-frame encoding mode to encode the pixel block to determine whether to use at least one of the first intra-frame encoding mode or the first inter-frame encoding mode to encode the pixel block, at least one of the distortion adjuster or the mode selector implemented by hardware or at least one processor.

15. The video encoder as defined in claim 14, wherein the characteristic is a first characteristic and the distortion adjuster is to adjust the intra-frame encoding distortion metric based on a combination of characteristics, the combination including at least one of an encoding resolution to encode the pixel block or an indication whether the pixel block is a reference block to be used to encode other pixel blocks.

16. The video encoder as defined in claim 14, wherein the scale factor is one of a plurality of scale factors associated with a plurality of possible characteristics.

17. The video encoder as defined in claim 14, wherein the distortion adjuster is to adjust the intra-frame encoding distortion metric, after being scaled, by an offset associated with the characteristic.

18. The video encoder as defined in claim 14, wherein the scale factor is a value greater than or equal to one.

19. The video encoder as defined in claim 14, wherein the mode selector is to:
   determine to use the first intra-frame encoding mode to encode the pixel block if the adjusted intra-frame encoding distortion metric is less than the inter-frame encoding distortion metric; and
   determine to use the first inter-frame encoding mode to encode the pixel block if the inter-frame encoding distortion metric is less than the adjusted intra-frame encoding distortion metric.

20. The video encoder as defined in claim 14, wherein the first intra-frame encoding mode has a lowest intra-frame encoding distortion metric from among a plurality of intra-frame encoding modes capable of being used to encode the pixel block, and the first inter-frame encoding mode has a lowest inter-frame encoding distortion metric from among a plurality of inter-frame encoding modes capable of being used to encode the pixel block.

21. The video encoder as defined in claim 14, wherein the hardware or the at least one processor is to:
   determine the intra-frame encoding distortion metric using original input pixels as predictors for intra-frame prediction of the pixel block performed according to the first intra-frame encoding mode; and
   determine the inter-frame encoding distortion metric using reconstructed pixels as predictors for inter-frame prediction of the pixel block performed according to the first inter-frame encoding mode, the reconstructed pixels obtained by decoding a previously encoded reference block that is to be used to encode the pixel block according to the first inter-frame encoding mode.

22. An apparatus for video encoding, the apparatus comprising:
   means for obtaining an intra-frame encoding distortion metric representative of distortion associated with a first intra-frame encoding mode for encoding a pixel block in a frame of a video sequence;
   means for adjusting the intra-frame encoding distortion metric based on a characteristic associated with the pixel block to determine an adjusted intra-frame encoding distortion metric, the characteristic corresponding to a quantization step size to be used to encode the pixel block, the adjusting of the intra-frame encoding distortion metric including scaling the intra-frame encoding distortion metric by a scale factor selected based on the quantization step size, and the value of selected scale factor is monotonically non-decreasing as a function of the value of the quantization step size; and
   means for comparing the adjusted intra-frame encoding distortion metric with an inter-frame encoding distortion metric representative of distortion associated with a first inter-frame encoding mode for encoding the pixel block to determine whether to use at least one of the first intra-frame encoding mode or the first inter-frame encoding mode to encode the pixel block.

23. The apparatus as defined in claim 22, wherein the scale factor is selected, based on the characteristic, from a plurality of scale factors associated with a plurality of possible characteristics.

24. The apparatus as defined in claim 22, wherein the means for adjusting is further to adjust the intra-frame encoding distortion metric, after the scaling, by an offset associated with the characteristic.

25. The apparatus as defined in claim 22, wherein the scale factor is a value greater than or equal to one.

* * * * *